US012651159B2

(12) United States Patent  
Mozo Velasco et al.

(10) Patent No.: US 12,651,159 B2  
(45) Date of Patent: Jun. 9, 2026

(54) COMPUTER-IMPLEMENTED METHOD FOR ACCELERATING CONVERGENCE IN THE TRAINING OF GENERATIVE ADVERSARIAL NETWORKS (GAN) TO GENERATE SYNTHETIC NETWORK TRAFFIC, AND COMPUTER PROGRAMS OF SAME

(71) Applicant: Telefonica, S.A., Madrid (ES)

(72) Inventors: Alberto Mozo Velasco, Madrid (ES); Sandra Gomez Canaval, Madrid (ES); Antonio Pastor Perales, Madrid (ES); Diego R. Lopez, Madrid (ES); Edgar Talavera Munoz, Madrid (ES)

(73) Assignee: Telefonica, S.A., Madrid (ES)

( * ) Notice: Subject to any disclaimer, the term of this patent is extended or adjusted under 35 U.S.C. 154(b) by 946 days.

(21) Appl. No.: 17/788,999

(22) PCT Filed: Dec. 26, 2019

(86) PCT No.: PCT/ES2019/070883  
§ 371 (c)(1),  
(2) Date: Jun. 24, 2022

(87) PCT Pub. No.: WO2021/130392  
PCT Pub. Date: Jul. 1, 2021

(65) Prior Publication Data  
US 2023/0049479 A1 Feb. 16, 2023

(51) Int. Cl.  
*G06N 3/08* (2023.01)

(52) U.S. Cl.  
CPC ...................................... *G06N 3/08* (2013.01)

(58) Field of Classification Search  
CPC ...................................................... G06N 3/08  
See application file for complete search history.

(56) References Cited

U.S. PATENT DOCUMENTS

2019/0122120 A1* 4/2019 Wu .......................... G06N 3/084  
2019/0190815 A1* 6/2019 Thubert .............. H04L 47/2441  
(Continued)

OTHER PUBLICATIONS

Heusel, M., Ramsauer, H., Unterthiner, T., Nessler, B., & Hochreiter, S. (Dec. 2017). Gans trained by a two time-scale update rule converge to a local nash equilibrium. Advances in neural information processing systems, 30. (Year: 2017).*  
(Continued)

*Primary Examiner* — Michael J Huntley  
*Assistant Examiner* — Maggie Thanh Maido  
(74) *Attorney, Agent, or Firm* — Sughrue Mion, PLLC

(57) ABSTRACT

Proposed are a computer-implemented method for accelerating convergence in the training of generative adversarial networks (GAN) to generate synthetic network traffic, and computer programs of same. The method allows the GAN network to ensure that the training converges in a limited time period less than the standard training period of existing GAN networks. The method allows results to be obtained in different use scenarios related to the generation and processing of network traffic data according to objectives such as the creations of arbitrary amounts of simulated data (a) with characteristics (statistics) similar to real datasets obtained from real network traffic, but (b) without including any part of any real dataset; diversity in the type of data to be created: IP traffic, network attacks, etc.; and the detection of changes in the network traffic patterns analysed and generated.

12 Claims, 5 Drawing Sheets

(56) References Cited

U.S. PATENT DOCUMENTS

| | | | |
|---|---|---|---|
| 2020/0090002 A1* | 3/2020 | Zhu | G06N 3/047 |
| 2020/0097554 A1* | 3/2020 | Rezagholizadeh | G06N 3/08 |

OTHER PUBLICATIONS

He, H., Wang, H., Lee, G. H., & Tian, Y. (Jul. 2018). Bayesian modelling and monte carlo inference for GAN. In International Conference on Learning Representations (vol. 3, p. 4). (Year: 2018).*

Ring, M., Schlör, D., Landes, D., & Hotho, A. (Jan. 2019). Flow-based network traffic generation using generative adversarial networks. Computers & Security, 82, 156-172. (Year: 2019).*

Markus Ring, et al . . . "Flow-based network traffic generation using Generative Adversarial Networks", Computers and Security, May 1, 2019, pp. 156-172, vol. 82.

Charu C. Aggarwal. Neural Networks and Deep Learning, [textbook]. Dec. 31, 2018, Springer, Cham, Switzerland, ISBN 978-3-319-94463-0.

Martin Heusel, et al . . . "GANs Trained by a Two Time-Scale Update Rule Converge to a Local Nash Equilibrium", Advances In Neural Information Processing Systems, 31st Conference on Neural Information Processing Systems, Nov. 30, 2016, pp. 6627-6638, vol. Dec. 2017.

International Search Report for PCT/ES2019/070883 dated Jul. 28, 2020 [PCT/ISA/210].

* cited by examiner

1

COMPUTER-IMPLEMENTED METHOD FOR ACCELERATING CONVERGENCE IN THE TRAINING OF GENERATIVE ADVERSARIAL NETWORKS (GAN) TO GENERATE SYNTHETIC NETWORK TRAFFIC, AND COMPUTER PROGRAMS OF SAME

CROSS REFERENCE TO RELATED APPLICATIONS

This application is a National Stage of International Application No. PCT/ES2019/070883, filed on Dec. 26, 2019.

TECHNICAL FIELD

The present invention relates to a method, and to computer programs, for accelerating convergence in the training of GAN networks to generate synthetic network traffic.

BACKGROUND OF THE INVENTION

GAN networks [1] have recently emerged as a new model of Deep Neural Networks based on Adversarial Learning. These networks (as well as other Deep Learning models) have arisen in the area of the computer vision in fields such as image generation and processing [1][2], feature learning [3], image editing [4], image-to-image translation [5] or dataset augmentation [6], among others.

The machine learning method in GAN networks is based on two clearly different roles, each of which is performed by an independent neural network. It can informally be asserted that the purpose of the generator neural network is to generate misleading information that seems real. The purpose of the other network called discriminator network is to identify real information from misleading information. The interaction dynamics of these two neural networks within training simulates a "game of two adversaries", the overall purpose of which is to generate information that passes as real. In other words, what is intended is for the generator neural network to specialise in generating information that is as close to reality as possible so that the discriminator neural network is unable to distinguish that said information has been generated by the generator.

A GAN network is defined as described below:

Let x be an example of a real piece of data from a distribution $p_x$ and z a random vector in $\mathbb{R}^d$. z is considered to come from a uniform distribution with a support of $[-1,1]d$, but different distributions such as the multivariate normal distribution can be applied. Let g and f be the generator and discriminator models, respectively. The generator model takes z as input and produce an image g(z) as output having the same support as x. The distribution of g(z) is denoted as $p_G$. Function f estimates the probability of an input image being generated from $p_x$. Ideally, f(x)=1 if x~$p_x$ and f(x)=0 if x~$P_G$.

A GAN network corresponds with a two-player minmax set which solves the following target function:

$$\max_g \min_f V(f,g) = E_{x\sim p_x}[-\log(1-f(g(z)))] \qquad \text{(Eq. 1)}$$

Where E is the expected or mean value function.

In practice, this function can be solved in an approximate manner by alternating the following two steps of updating gradients:

2

$$\theta_f^{t+1} = \theta_f^t - \lambda^t \nabla_{\theta_f} V(f^t, g^t) \qquad \text{Step 1}$$

$$\theta_g^{t+1} = \theta_g^t - \lambda^t \nabla_{\theta_g} V(f^{t+1}, g^t) \qquad \text{Step 2}$$

where $\theta_f$ and $\theta_g$ are parameters of f and g, $\lambda$ is the learning rate and t is the number of the iteration.

By adding extra information to the input of the previous model, the process of generating examples performed by the generator neural network can be "directed". If in the input of the generator, y is the additional information, i.e., the information in labels for the data to be generated, the target function is as follows:

$$\max_g \min_f V(f,g) = E_{x\sim p_x}[-\log f(x|y) + E_{z\sim p_z}[-\log(1-f(g(z|y)))] \qquad \text{(Eq. 2)}$$

This specialisation of the seminal model is referred to as conditional GAN networks (cGAN) [25]. FIG. 1 illustrates the architecture of this model. The generator can produce synthetic data of different classes, depending on the input value "y". The output value D(x/y) is the output probability of function D when the input is x. Function D generates a value of probability 1.0 if it recognises the input as a real piece of data and 0.0 if it believes that the input is synthetic. Intermediate values between 1.0 and 0.0 indicate uncertainty in the decision. x is a value belonging to set X of all the possible data that the generator neural network can generate; x/y is a piece of synthetic data of X but conditional to the input to the generator having been "y" (this is represented as "x/y" in statistics). In summary, D(x/y) indicates the probability of the discriminator recognising an example synthetic x of class y (x has been generated by the generator with "y" as input) as real (value close to 1.0).

GANs present problems of instability and inefficiency in training [15][16][17]. In most cases, instability relates to the difficulty with convergence of the model (for example when the target function carries out optimisation by updating the gradients) and the disequilibrium in training between both components ("G" and "D"). Reference to convergence in the training of GAN networks is a reference to the ability to find a solution in a limited time and this solution is a quality solution (the data generated is valid and similar to real data).

Based on references found in the literature and in the practical experience of inventors, a large number of GAN networks do not converge [26][27]. This convergence problem in the GAN model causes these GAN networks not to ensure an acceptable convergence success rate in practice. This convergence rate can be measured through the following factors:

- number of trainings finding a solution in a limited time,
- number of solutions found in a limited time which have a real usefulness and are quality solutions, i.e., synthetic data statistically similar to real data and therefore reliable to be used as a substitute for real data.

The papers found in the literature addressing this problem include the following:

[3][20]: these papers propose extensions of the original GAN model to stabilise the problem of training the GAN network. These proposals consist of adding deeper and more sophisticated neural network layers to the original model for each of the components. They also propose more sophisticated methods for the optimisation function (1). These papers are proposed in the context of generating and processing images. In particular, these two proposals depart significantly from the original GAN model, from its simplicity and from its computational cost.

[18][19]: these papers propose improving the problem of stabilising training using more sophisticated methods for the optimisation function (1). These solutions are proposals in the context of generating and processing images. Like the two previous proposals, these proposals depart significantly from the original proposal of the GAN model, from its simplicity and from its computational cost.

[15][20][21][22][23]: these papers propose extensions of the GAN model using more sophisticated methods for the optimisation function to ensure convergence. These extensions are proposals in the context of processing and generating images. These methods impose a significant computational cost on the training of the neural network [16].

[13]: this paper introduces the application of the extension of the GAN model referred to as WGAN [15] for generating network traffic based on flows with typical attributes. Although this paper proposes a model that processes network traffic flows (and not images such as in the previously mentioned papers), the WGAN architecture used contributes a significant computational cost to the training of the GAN network [16]. This proposal departs from the original nature of the GAN and from the simplicity of its architecture. Additionally, there is no analysis whatsoever for the problem of convergence or any method to overcome it.

[24]: a WGAN [15] is also applied in this paper for generating examples of malicious network traffic. Although this paper proposes a model that generates examples of data that are neither images nor video, the WGAN model adds a significant computational cost to the training of the GAN network [16]. This proposal departs from the original nature of the GAN and from the simplicity of its architecture. Additionally, there is no analysis whatsoever for the problem of convergence or any method to overcome it.

[14]: this paper applies the GAN model for generating examples that cannot be detected by malware identification algorithms. This paper shows results with instability in convergence of the training and makes no contribution to improving this problem, which does not ensure that results will be obtained.

Furthermore, some patents or patent applications in this field are also known. However, available solutions in the literature use the original GAN model, and none of them addresses the problem of training instability and inefficiency, and therefore, from the practical view point, they are intended to present the problems of convergence indicated in the literature [15][16]. The patent proposals found are listed below:

JP2018125632A [9]. This patent application presents a GAN network model for the generation of (apparently synthetic) sub-traffic and the identification of the type of traffic it is. The proposal uses a conventional GAN architecture without considering the problem of training instability, convergence and the lack of quality assurance of the obtained results. Some of the main differences with the present invention are that the present invention causes models such as the one herein proposed to ensure convergence. Likewise, the model proposed by the present invention generates network traffic among which attack traffic is included, and proposes data expansion, i.e., it allows more data to be generated than what exists in the original dataset). The method of the present invention ensures anonymity in the production of synthetic information.

CN108718290A [10]. This patent application uses an original GAN to generate network attacks with a specific set of attributes. The problem of training instability, convergence or quality assurance of the obtained results is not considered. In contrast, the method of the present invention ensures convergence, does not just generate attack traffic but also generates any IP traffic, proposes data expansion, i.e., it allows more data to be generated than what exists in the original dataset), and ensures anonymity in the production of synthetic information.

CN108769993A [11]. This patent application uses a GAN network to detect user anomalies by constructing a dataset through the data generated by the generator neural network and a normal user. The main difference with the present invention is that the proposed method is entirely automated and does not require human intervention to carry out a tasks. Likewise, the method proposed in the present invention ensures convergence.

US20180336439A1 [12]. This patent application only relates to image processing and therefore is not directly related to the present invention.

In summary, the methods and extensions of original GAN model proposed in papers from the state of the art address the problems of training instability and therefore of convergence, focusing on the modification of training methods, of updated gradients, of functions for finding minimisation of the difference between real and generated distribution and the sophistication of the original architecture. These methods solve, or in some cases minimise, these problems by adding more sophisticated elements that work to the detriment of computational yield [16]. Additionally, they are all proposed in image and video data domains.

Likewise, none of the patents found and described above studies the training stability and convergence or proposes a method for achieving same. This is considered a lack of any assurance to obtain a robust model that is able to offer solutions in the proposed data domains.

REFERENCES

[1] I. Goodfellow, J. Pouget-Abadie, M. Mirza, B. Xu, D. Warde-Farley, S. Ozair, A. Courville, Y. Bengio, "Generative Adversarial Nets", Advances in Neural Information Processing Systems, vol. 27, pp. 2672-2680, (204).

[2] Z. Pan, W. Yu, X. Yi, A. Khan, F. Yuan and Y. Zheng, "Recent Progress on Generative Adversarial Networks (GANs): A Survey," in IEEE Access, vol. 7, pp. 36322-36333, (2019).

[3] A. Radford, L. Metz, S. Chintala, "Unsupervised representation learning with deep convolutional generative adversarial networks", arXiv preprint arXiv:1511.06434, (2015).

[4] J. Zhu, Y. Yan, P. Krshenbuhl, E. Shechtman, E. Alexei, B. Leibe, J. Matas, N. Sebe, M. Welling, "Generative Visual Manipulation on the Natural Image Manifold Max", Proceedings Computer Vision—ECCV 2016 Springer International Publishing, pp. 597-613, (2016).

[5] J. Zhu, T. Park, P. Isola and A. A. Efros, "Unpaired Image-to-Image Translation Using Cycle-Consistent Adversarial Networks," IEEE International Conference on Computer Vision (ICCV), pp. 2242-2251, (2017). doi: 10.1109/ICCV.2017.244

[6] A. Antreas, S. Amos, E. Harrison, "Data Augmentation Generative Adversarial Networks", arXiv preprint arXiv: 1711.04340, (2017).

[7] T. Miyato, T. Kataoka, M. Koyama, Y. Yoshida, "Spectral Normalization for Generative Adversarial Networks", CoRR, vol. abs/1802.05957, (2018).

[8] H. Zhang, I. Goodfellow, D. Metaxas, A. Odena, "Self-Attention Generative Adversarial Networks", Proceedings of the 36th International Conference on Machine Learning, PMLR, vol. 97, pp. 7354-7363, (2019).

[9] Traffic generation device and traffic generation method. Patent #: JP2018125632A. URL: https://patents.google.com/patent/JP2018125632A/en

[10] Network attack generation based on GAN: Create new network attack data (patent #: CN108718290A • 2018 Oct. 30)

[11] Method for detecting abnormal user of communication network based on generated confrontation network. Patent #CN108769993A • 2018 Nov. 6)

[12] Novelty detection using discriminator of generative adversarial network (patent #US20180336439A1—2018 Nov. 22)

[13] M. Ring, D. Schlor, D. Landes, A. Hotho, "Flow-based network traffic generation using Generative Adversarial Networks", Computers & Security, vol. 82, pp. 156-172 (2018).

[14] W. Hu, Y. Tan, "Generating Adversarial Malware Examples for Black-Box Attacks Based on GAN". arXiv: 1702.05983, (2017).

[15] M. Arjovsky, S. Chintala, L. Bottou, "Wasserstein GAN", eprint arXiv:1701.07875 (2017).

[16] N. Kodali, J. Abernethy, J. Hays, Z. Kira, "On Convergence and Stability of GANs", ArXiv eprint arXiv: 1705.07215, (2017).

[17] M. Arjovsky, L. Bottou. "Towards principled methods for training generative adversarial networks", arXiv preprint arXiv:1701.04862, (2017).

[18] T. Salimans, I. Goodfellow, W. Zaremba, V. Cheung, A. Radford, X. Chen, "Improved Techniques for Training GANs", Proceedings of the 30th International Conference on Neural Information Processing Systems—NIPS'16, pp. 2234-2242, (2016).

[19] X. Chen, Y. Duan, R. Houthooft, J. Schulman, I. Sutskever, P. Abbeel, "InfoGAN: Interpretable Representation Learning by Information Maximizing Generative Adversarial Nets", Proceedings of the 30th International Conference on Neural Information Processing Systems—NIPS'16, pp. 2180-2188, (2016).

[20] J. Zhao and M. Mathieu and Y. LeCun, "Energy-based generative adversarial network", CoRRs, preprint arXiv: 1609.03126, (2016).

[21] L. Metz and B. Poole and D. Pfau and J. Sohl-Dickstein, "Unrolled generative adversarial networks", CoRRs, preprint arXiv abs/1611.02163, (2016).

[22] G. Qi, "Loss-sensitive generative adversarial networks on lipschitz densities", CoRRs, preprint arXiv, (2017).

[23] I. Gulrajani and F. Ahmed and M. Arjovsky and V. Dumoulin and A. Courville, "Improved Training of Wasserstein GANs", Proceedings of the 31st International Conference on Neural Information Processing Systems—NIPS'17, pp. 5769-5779, (2017).

[24] L. Zilong, S. Yong, X. Zhi, "IDSGAN: Generative Adversarial Networks for Attack Generation against Intrusion Detection", CoRRs, preprint eprint arXiv: 1809.02077, (2018).

[25] M. Mirza, S. Osindero, "Conditional generative adversarial nets", CoRRs, preprint eprint arXiv:1411.1784, (2014).

[26] I. Goodfellow. "On distinguishability criteria for estimating generative models". arXiv preprint arXiv: 1412.6515, 2014.

[27] T. Salimans, I. Goodfellow, W. Zaremba, V. Cheung, A. Radford, X. Chen. "Improved techniques for training GANs". In Proceedings of the 30th International Conference on Neural Information Processing Systems (NIPS'16), pp. 2234-2242. 2016.

DISCLOSURE OF THE INVENTION

According to a first aspect, the present invention provides a computer-implemented method for accelerating convergence in the training of GAN networks to generate synthetic network traffic. In particular, the method comprises:

a) receiving, in a generator of the GAN, identifiers of at least one class of network traffic and the generator generating, using a random vector, synthetic network traffic elements of the class of network traffic corresponding to each of said identifiers received, generating as a result a dataset of synthetic network traffic data;

b) training a discriminator of the GAN using elements of a dataset of real network traffic and of the dataset of synthetic network traffic data generated, wherein: each element of the dataset of real network traffic is provided to the discriminator identified by the class of traffic to which it belongs and each element of the dataset of synthetic network traffic is provided to the discriminator identified as synthetic traffic; the elements of the dataset of synthetic network traffic represent a smaller percentage of the total number of elements than that of the elements of the dataset of real network traffic; and the training process for the discriminator includes adjusting internal parameters of the discriminator on the basis of which its output is generated;

c) training the generator by generating new synthetic network traffic data according to step a), wherein: each element of the dataset of synthetic network traffic generated is provided to the discriminator identified by its class of traffic; during the training process for the generator, the discriminator does not modify its internal parameters; the training process for the generator includes adjusting the internal parameters of the generator, which determine the output the generator generates depending on the input it receives, said adjusting being performed based on a probability of the discriminator classifying an element of the dataset of synthetic network traffic as real traffic; and the total set of elements provided to the discriminator in step c) is greater, by a predetermined ratio, than the total set of elements provided in step b); and d) comparing statistical distributions of the dataset of real network traffic and of the dataset of synthetic network traffic according to the following steps:

d.1) generating statistical data of the dataset of real network traffic for each set of elements of one and the same class of traffic;

d.2) repeating step a) using the internal parameters of the generator adjusted in step c), until generating a dataset of synthetic network traffic data having a size similar to the dataset of real network traffic;

d.3) generating statistical data of the dataset of synthetic network traffic generated in step d.2) for each set of elements of one and the same class of traffic;

d4) comparing the statistical data generated in step d.1) with the statistical data obtained in step d.3) for each class of network traffic, and d.4.1) if the difference of the statistical data is less than a predetermined threshold for each class of traffic, the method of training the GAN is concluded;

d.4.2) otherwise, steps a) to d) are run again on the basis of the parameters of the generator and of the discriminator resulting from the previous steps.

In an exemplary embodiment of the present invention, the predetermined threshold is specific for each of the classes of traffic. Alternatively, in another exemplary embodiment, the predetermined threshold is the same for all the classes of traffic.

In an exemplary embodiment, the proposed method further comprises performing a detection of the divergence of the GAN in the second and successive runs of step d), checking between steps d.4.1 and d.4.2 if the difference between the statistical data generated in step d.1) and the statistical data obtained in step d.3) is greater than in the previous run of step d) for at least one class of traffic, in which case the method of training the GAN is restarted on the basis of internal parameters of the generator and of the discriminator different from those resulting from the previous steps.

After the mentioned restarting, the percentage of elements of the dataset of synthetic network traffic out of the total number of elements and the ratio of elements provided to the discriminator in step c) out of the total number of elements provided in step b), have a value different from their value before said restarting.

According to the proposed method, the statistical data may comprise the mean or standard deviation of at least one characteristic parameter of the network traffic elements. Likewise, the network traffic may comprise web network traffic, video traffic and/or traffic coming from a cloud storage service.

In an exemplary embodiment, the percentage of elements of the dataset of synthetic network traffic out of the total number of elements is between 1% and 20%.

In an exemplary embodiment, the mentioned predetermined ratio is in the range of 10-100.

The random vector may have a uniform distribution with a support of $[-1,1]^d$ or alternatively a multivariate normal distribution.

Other embodiments of the invention which are disclosed herein also include computer program products for performing the steps and operations of the method proposed in the first aspect of the invention. More particularly, a computer program product is an embodiment which has a computer-readable medium including computer program instructions coded therein which, when run in at least one processor of a computer system, cause the processor to perform the operations indicated herein as embodiments of the invention.

The present invention thereby provides a convergence acceleration model in GAN networks which ensures the generation and processing of data organised as flows with a time series structure which is very far from the typical application domain of GAN networks. The existing proposals addressing the convergence problem (regardless of their advantages and disadvantages) relate to the generation and processing of images and videos, and there are no papers relating to data types other than these two.

Likewise, the present invention advantageously provides:

Convergence guarantee: the proposed method is able to ensure the acceleration of convergence (reliable and quality synthetic data produced in a limited time) as a result of two processes:

the process for the "early detection of convergence problems" or process for the detection of divergence (oscillation) can be seen as a quality control process and is a very significant advantage offered by the present invention versus the instability and non-guarantee of existing methods. This process allows a GAN network to increase the success rate and convergence speed of the GAN network and to prevent the synthetic data that the network is generating from not having the expected quality because it is not statistically similar to the real data.

controlled A/D training process: this process consists of a global synchronisation of the system with the acceleration of the generator versus the deceleration of the discriminator. This process allows the present invention to control the "game" between the discriminator D and the generator G and to obtain a convergence of the GAN training system in practice.

Guarantee of the preservation of anonymity: the proposed method allows creations of arbitrary amounts of synthetic data with characteristics (statistics) similar to real datasets obtained from different types of real network traffic without including any part of the real dataset, and therefore without the risk of including personal, sensitive or confidential data.

Versatility: The proposed method allows the processing of data represented as data flows organised as a time series. This is clearly different from the conventional data domains in GANs (images and videos).

Applicability in different network traffic use scenarios: in the sense that the proposed method is applied to a GAN models which perform any task relating to the generation of network traffic, the generation of network attacks, the identification of attacks or of unusual traffic, cryptomining, among other related tasks. In this context, the proposed method is "agnostic" to the type of network traffic data it processes.

Simplicity: The proposed method is applicable to any original GAN model, causing it to have a limited response time for all cases and to therefore be faster than existing solutions. The above translates into lower use of computational resources such as memory and CPU.

Reliability of the results: the invention ensures that the synthetic data generated has statistical characteristics similar to the real data, and there is no possibility of reverse engineering to obtain information from the real dataset, as they are different data.

BRIEF DESCRIPTION OF THE DRAWINGS

The foregoing and other features and advantages will be more fully understood from the following detailed description, by way of mere illustration and not limitation, of some exemplary embodiments with reference to the attached drawings, wherein.

DETAILED DESCRIPTION OF THE INVENTION AND EXEMPLARY EMBODIMENTS

Figure 1:
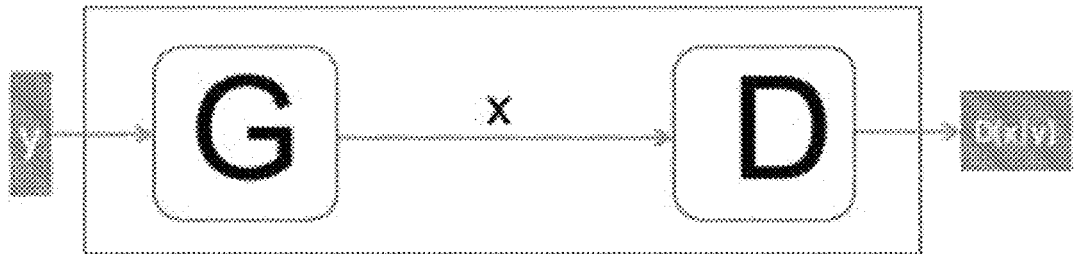
FIG. 1 illustrates an example of the architecture of a CGAN network, as known in the state of the art.

The present invention proposes the application of GAN networks for the generation of data in different network traffic use scenarios through the configuration of a conditional GAN network (cGAN) and a feature input vector "y". This vector can be configured depending on the type of dataset to be generated, which allows the generation of synthetic datasets with as many different classes as needed within the use scenario. For example, in a particular example, synthetic data belonging to two different classes of traffic may be generated: class of normal traffic and class of cryptomining traffic. In this particular case, the input vector "y" will take two values, 0 and 1, to represent elements of the class of normal traffic (y=0) and of the class of cryptomining traffic (y=1), respectively.

Given the complexity of the function to be optimised in a GAN network (Eq. 1) and in particular in a cGAN network (Eq. 2), the most practical way to optimise same is by performing a two-step iterative process. First, the first term is optimised (by training the discriminator or discriminator neural network D) to subsequently optimise the second term (the generator or neural network generator G). This process is repeated N times until the generator G generates synthetic data of certain quality. The problem of this method of optimisation is that it naturally generates in most cases instability and a lack of convergence since it does not optimise all the gradients in one and the same round.

The present invention can be described on the basis of a set of methods, run or implemented by one or more processors of a computer device which, when combined, allow the two-phase training of GAN networks to be optimised for the purpose of ensuring convergence and accelerating their training. Each of these characteristics is described below:

Early detection of convergence problems: The proposed method proposes a process for the detection of divergence in the training process, which compares (by statistical means) the synthetic examples obtained and the real examples. If the result of the comparison indicates that the system is in an oscillation or divergence situation (which means that the two neural networks diverge and that generator G is moving away from the objectives defined for its training), the process stops the training to subsequently recommence training again with new hyperparameters. The proposed method thereby ensures not only that the global neural network (G network+D network) converges, but also that the synthetic results correspond with what is expected (that is, they are statistically similar to the real data).

Controlled A/D training: The proposed method performs global training by separately controlling the training speeds of each neural network (G and D). In particular, in neural network training iteration, said neural network is specialised in training neural network G (acceleration), leaving neural network D in a slowdown (deceleration) state. This means that the generator G is being trained, but under minimum constants of the discriminator D. This process, referred to as controlled acceleration/deceleration (controlled A/D) is carried out in a synchronised and controlled manner so as to ensure GAN network global training stability and therefore convergence thereof. To that end, the acceleration and deceleration are modulated by acting on the following hyperparameters in training: the learning rate of the optimiser of the discriminator D, the percentage of elements of the dataset of synthetic data out of the total number of elements and the ratio of elements provided to the discriminator D in the step of training the generator G of those provided in the step of training the discriminator D.

This approach is clearly different from the seminal model and the extensions proposed in the literature, because in these extensions, the learning rate is a global value of the target optimisation function which applies to both neural networks, as can be observed in equations (3) and (4). In the present invention, there is one learning rate per each neural network, i.e., a rate $\lambda^G$ and a rate $\lambda^D$. These two rates may vary throughout the process. The proposed method starts $\lambda^D$ with very small values (for example, two orders of magnitude below the optimisation algorithm default value) to be gradually increased as the generator G learns so that the discriminator D can learn to distinguish the increasingly more perfect synthetic examples produced by the generator G. Likewise, concealing a certain significant percentage of real examples from the discriminator D means that the latter does not initially learn (during the first iterations) the statistical distribution of the real examples, which allows the generator G to evolve in those first iterations and to learn to generate examples statistically similar to the real examples. The second hyperparameter, that is, the percentage of elements of the dataset of real data versus the dataset of synthetic data, must be adjusted so as to limit the number of pieces of synthetically generated data introduced in the discriminator D with respect to the cases of the real dataset or vice versa. By limiting the number of synthetic cases versus real examples, the ability of the discriminator D to detect a possible synthetic pattern of the generator G is curbed, the GAN network is prevented from failing to converge.

The last hyperparameter consists of establishing a suitable ratio of the elements provided to the discriminator D in the step of training the generator G with respect to those provided in the step of training the discriminator D, such that a larger number of elements are passed during the step of training the generator G.

This configuration offers guarantees to the global convergence process since the generator G will be able to evolve suitably and learn the statistical distributions of the real data without being blocked by a discriminator D that learns the real data distribution too soon and then no longer changes the internal parameters (or weights) thereof, so the generator G can no longer deceive it and therefore ceases to evolve.

Figure 2:
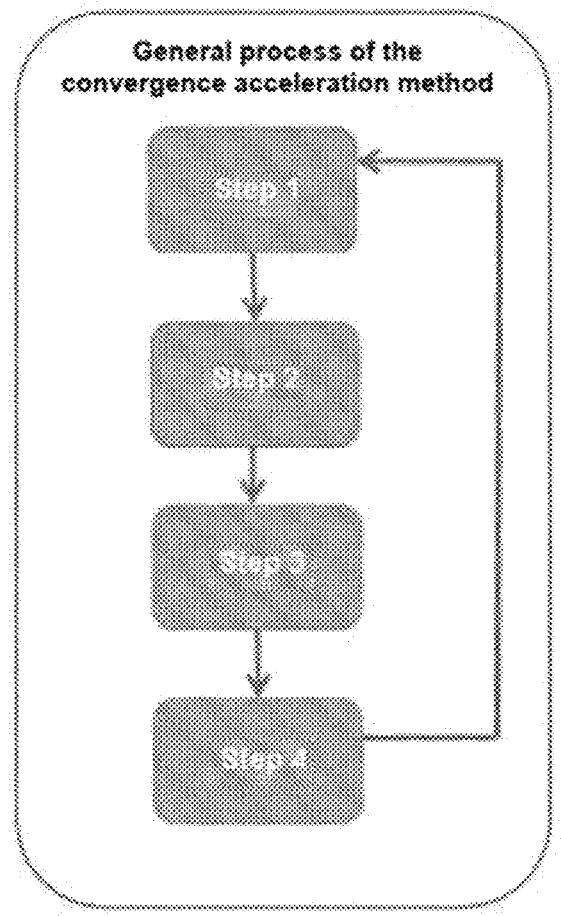
FIG. 2 schematically illustrates an exemplary embodiment of the general process performed by the proposed method for accelerating convergence.

FIG. 2 schematically illustrates an exemplary embodiment of the general process carried out by the proposed method, which includes the tasks described above. The tasks performed in each of the four steps are described in detail below.

Figures 3, 4:
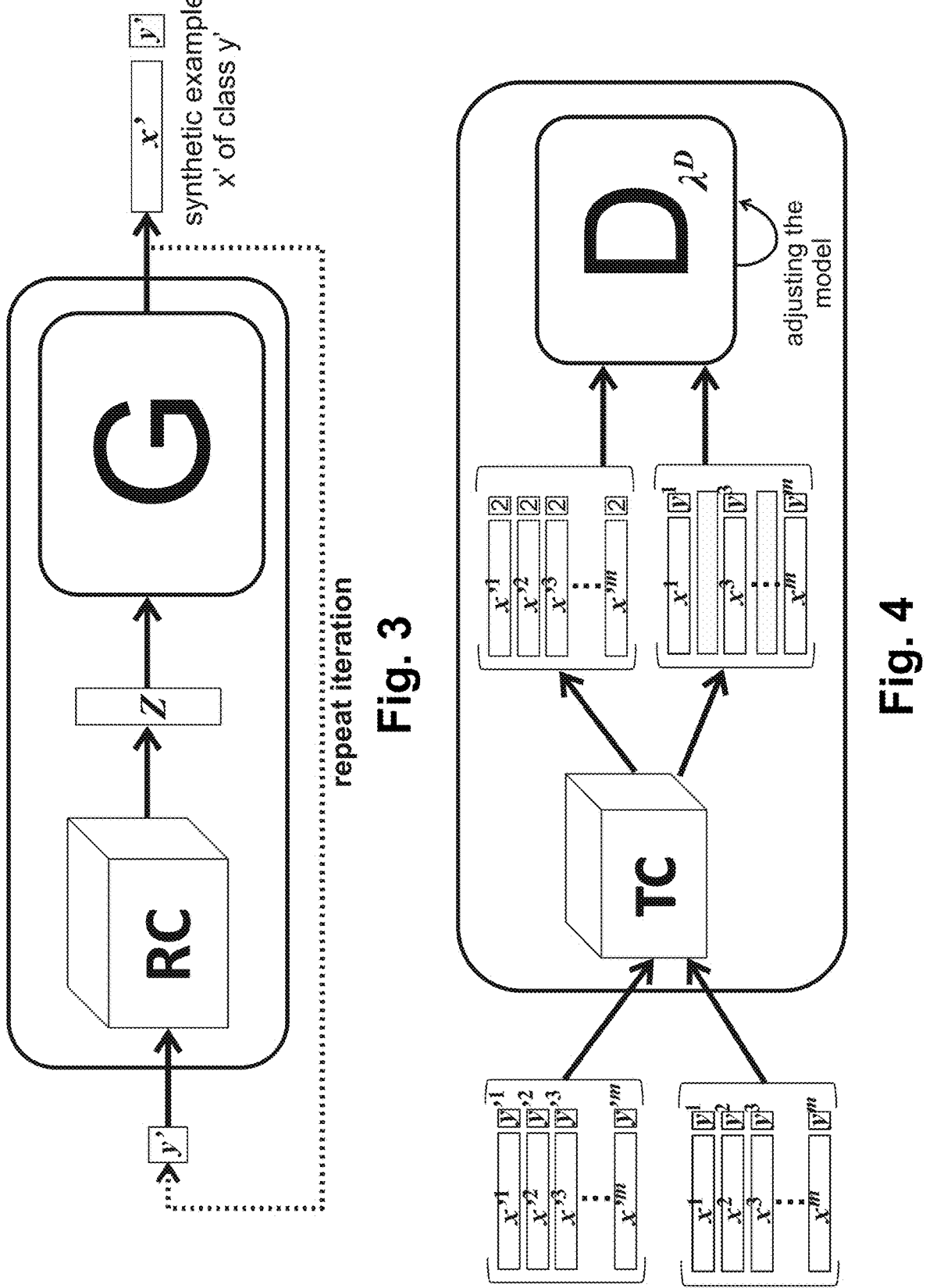
FIGS. 3-6 schematically illustrate each of the different steps of FIG. 2.

In step 1 (see FIG. 3), a component called a "randomisation component" RC, which is in charge of generating a random vector (z) depending on the value of y' (type or category of piece of synthetic data (label) to be generated), is used. Vector z is the result of generating a random vector multiplied by a value y' coding with an identical dimension. This vector z can be used as input for the generator G to produce a synthetic example (x') of the type/category y'. This randomisation of the y' vector allows multiple different synthetic examples of class y' to be obtained, using the same value y' as input. This step is run as many times as synthetic data is needed. Depending on the type of synthetic elements desired, y' will take values over the different types (categories) of elements existing in the real data. For example, in the event that there are two types of real data: normal traffic (y=0) and cryptomining traffic (y=1), y' could take the values 0, 1. The number of times y'=0 or y'=1 is used will depend on the proportion of synthetic examples of type 0 or 1 to be generated in the process. For the sake of notation simplicity, hereinafter the composition of the two elements RC+G of FIG. 3 will be considered the generator G.

In step 2 (see FIG. 4), training of the discriminator D is performed. First, a component called "Transformation Component" TC receives the dataset of synthetic traffic data generated in the preceding step as well as a dataset of real data also. Component TC assigns to each synthetic example a new label "k" instead of value y' that was associated with the synthetic example. This label "k" is a non-existent new value between the current values of y and allows the discriminator D to be trained to distinguish existing real elements from synthetic elements (which will always have the label with value "k"). For example, in the above-described scenario of network traffic mixed with cryptomining traffic, where there are two categories of data (normal traffic y=0 and cryptomining traffic y=1), the new value y' for all the synthetic examples would be 2 (seen in FIG. 4).

It has been experimentally observed that if the discriminator D learns the real data distribution too soon, the latter will block the learning of the generator G since it will not give it the chance to create realistic synthetic examples. As the discriminator D has learned the real data distribution too soon, the latter detects the synthetic data generated by the generator G with 100% precision and does not allow it to evolve during training of the generator G.

To prevent the above problem, a method is applied for slowing down the training of the discriminator D, reducing the learning rate of the optimisation algorithm ($\lambda^D$). This can be achieved, alternatively or in addition, by presenting to discriminator D a higher percentage of elements of the dataset of real network traffic. Successful results have been shown to be achieved by leaving a percentage of elements of the dataset of synthetic network traffic between 1% and 20% of the total.

Lastly, the discriminator neural network D is trained with both datasets, that is, the dataset of synthetic data with the modified labels and the dataset of real data. During the training process, the discriminator D will adjust its internal parameters for the purpose of minimising the number of poorly classified examples, which will produce a discriminator D with the ability to identify the real examples and to furthermore differentiate them from the synthetic examples (those having a label with the value 2 in FIG. 4).

Figure 5:
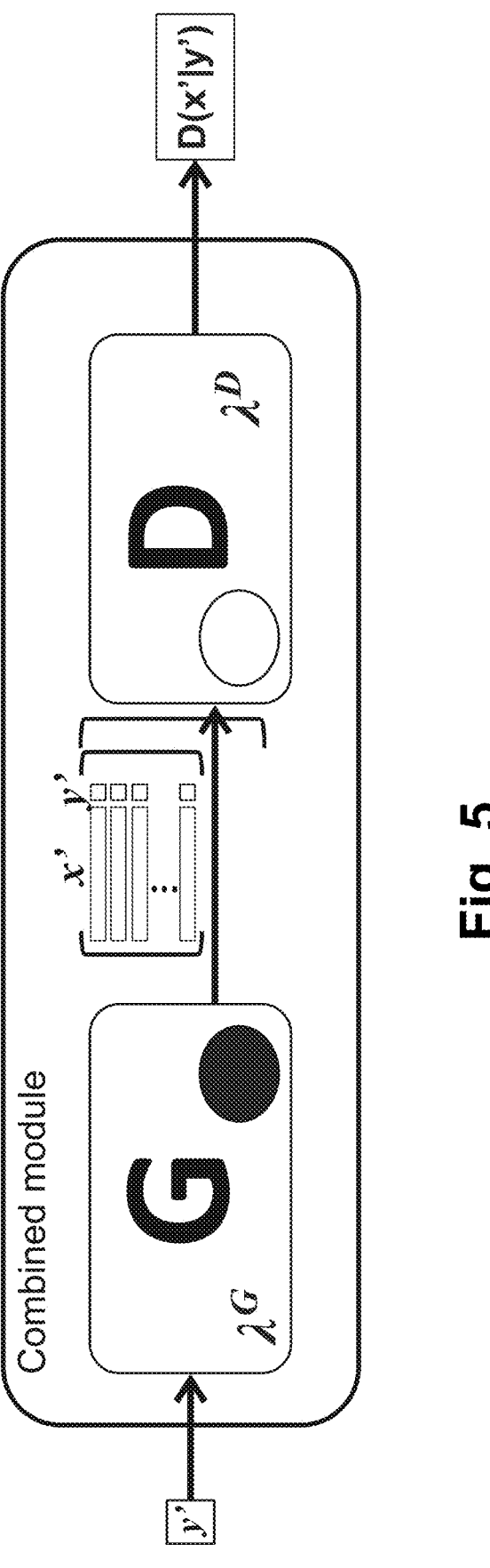

Step 3 is performed by means of a component called "Combined Module", which is in charge of training neural networks G and D through the "controlled A/D training" mechanism defined above. In particular, training of the generator G is carried out while the discriminator D is frozen (that is, its internal parameters are not modified during training, and therefore it does not learn anything in this step). By means of controlled A/D training, this module achieves two objectives: (1) letting generator G learn enough to start generating synthetic cases close to the valid cases, and (2) allowing, once generator G has evolved, the discriminator D to increase its detection ability the next time step 2 is run, which helps to obtain better results from the generator G the next time step 3 is run. FIG. 5 graphically shows this step being run.

It must be taken into consideration that the generator G can produce synthetic data of different classes, depending on the input value y'. Therefore, the notation D(x'/y') indicates the probability of the discriminator D recognising a synthetic value x' of class y' generated by the generator G with y' as input as being true. The degree of certainty of the discriminator D recognising x' as a real (not synthetic) element is higher if the value generated is close to 1.0 and vice versa, if the value generated by the discriminator D is close to 0.0, this indicates the certainty of the discriminator D that example x' is synthetic (not real). Note that the values y and y' belong to the same class: the different categories of existing network traffic data. In the example of generating cryptomining traffic and normal traffic, variables y and y' can take values 0 and 1. Notation y' emphasises that they are the values chosen as input for the generator G. In the available real data, the distribution of values 0 and 1 in y could be 50%, 50%, and yet y' could be forced to have a distribution of 75%, 25% to force the generator G to produce more examples of class 0 than of class 1.

Figure 6:
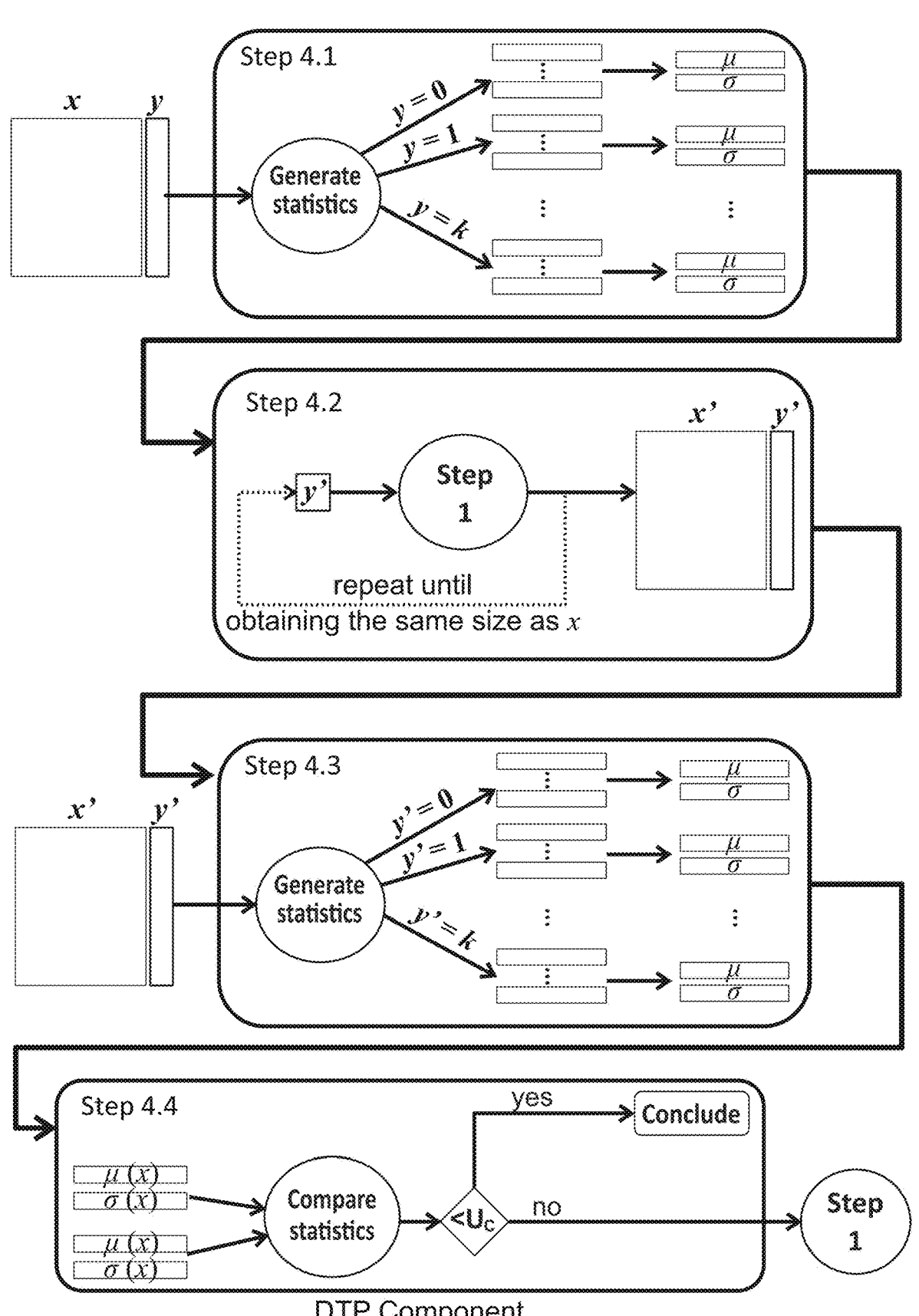

The last step performed by the proposed method, or step 4 of FIG. 2, is used to perform an early detection of convergence problems or early detection of divergence. FIG. 6 depicts a particular exemplary embodiment of this step 4, which comprises:

generating (step 4.1 of FIG. 6) statistical data, for example, the mean and standard deviation, among others, for each column (characteristic) of the dataset of real data X and for each cluster of examples of the same value y. As a result, mean and standard deviation vectors (having the same dimension as that of an element x) are obtained for each category of network traffic. In the example of cryptomining traffic, as there are two types of traffic 0 and 1, 2 mean and standard deviation vectors are obtained (one for each category of network traffic since it is possible for their statistical distributions to be different);

running (step 4.2 of FIG. 6) step 1 a number of times that are significant enough so as to generate a dataset of synthetic data (X') having a size similar to the dataset of real data X (or at least of a statistically relevant size);

repeating 4.1 (step 4.3 of FIG. 6) to obtain statistical mean and standard deviation vectors, but this time with X' (dataset of synthetic data);

comparing the statistical data obtained in step 4.1 with the data obtained in step 4.3 (step 4.4 of FIG. 6) and:

if the difference of the statistical data is less than a predetermined threshold for each class of traffic ($U_c$), the method of training the GAN is concluded;

otherwise steps 1 to 4 are run again on the basis of the parameters of the generator G and of the discriminator D resulting from the previous steps.

In an exemplary embodiment of the present invention, the predetermined threshold is specific for each of the classes of traffic, whereas in another exemplary embodiment, the predetermined threshold is the same for all the classes of traffic.

Figure 7:
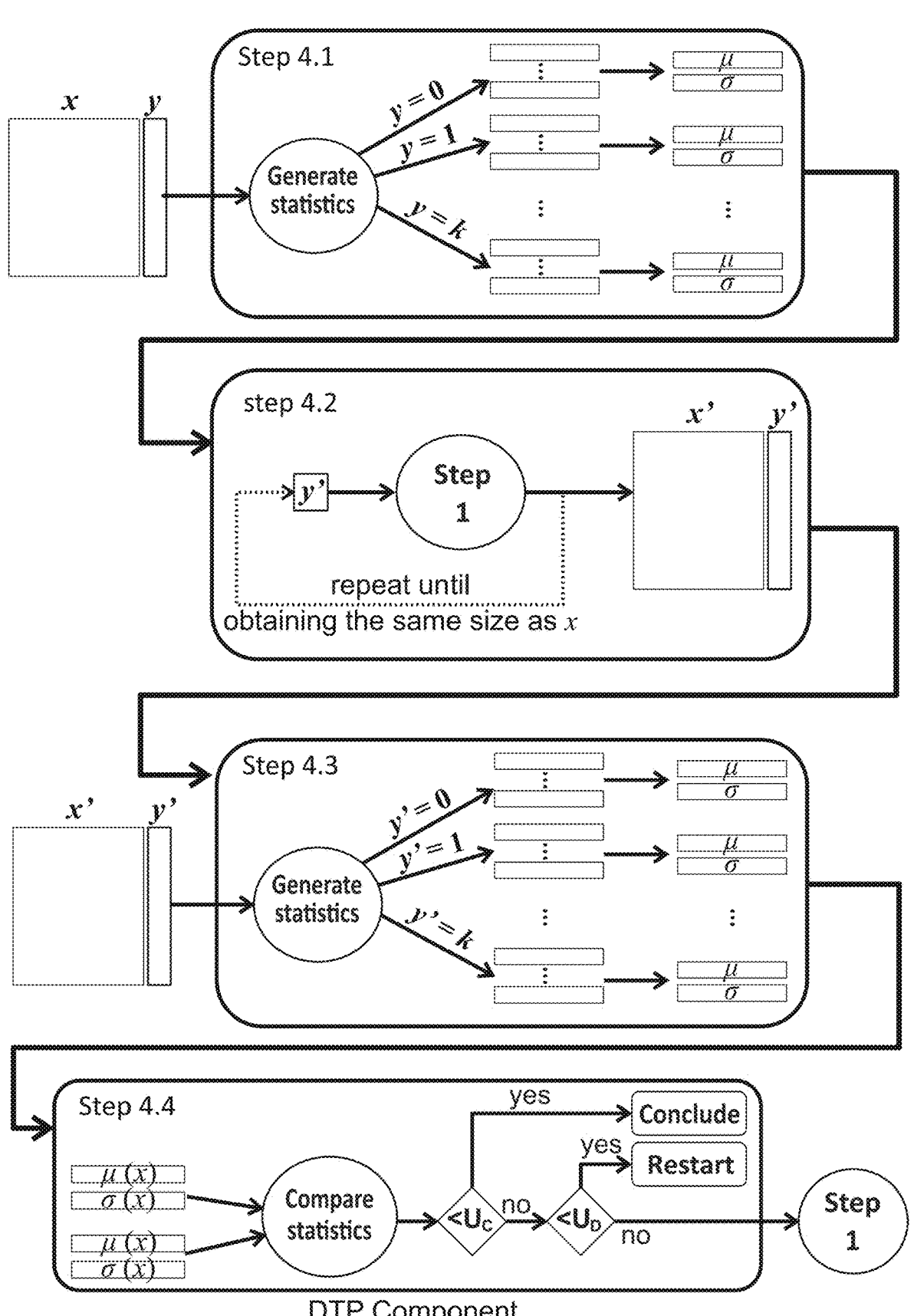
FIG. 7 schematically illustrates an alternative implementation of step 4 of FIG. 2.

In reference to FIG. 7, said figure shows another exemplary embodiment of the present invention. In this case, the method further comprises performing a detection of the divergence of the GAN in the second and successive runs of step 4 (FIG. 2). To that end, after checking that the difference of the statistical data is such that the method of training the GAN cannot be concluded, it is checked whether said difference between the statistical data generated in step 4.1 of FIG. 7 and the statistical data obtained in step 4.3 of FIG. 7 is greater than in the previous run of step 4 (FIG. 2) for at least one class of traffic, in which case the method of training the GAN is restarted on the basis of internal parameters of the generator Gy of the discriminator D different from those resulting from the previous steps.

An implementation of the CGAN of this invention solves the need to comply with anonymisation requirements pertaining to the original information, such that there is no possibility of correlating personal information between the synthetic data and the original data used in the training process. With this anonymisation, it is impossible to obtain original data with private information as there is no possibility to reverse engineer the synthetic data to reproduce or reconstruct the original dataset.

The amount of synthetic data that the model can produce once it is trained is virtually unlimited and not related to the training mode thereof. By modifying the dimension of vector z, can be ensured an increase/reduction of the amount of data that the model is able to generate can be ensured. The maximum theoretical value of producible synthetic values is $R^k$, where R is the set of values that can be represented in each element of the input vector "z" and k is the dimension of that vector. This allows a system which generates different amounts of synthetic output data to be implemented as needed.

The synthetic data produced by the generator G can be used as input for training other machine learning models that demand more data than the original data, new data different from the original data or data that does not violate anonymity and privacy restrictions being considered (for example the GDPR, the EU General Data Protection Regulation I).

In practice, with a small set of statistically representative input data, the present invention is able to generate the required amount of synthetic data. This capability allows to potentially continue expanding the amount of synthetic data generated.

The discriminator D is a module which, when taken to production, can be used to detect changes in network traffic patterns. The discriminator D is able to detect the evolution over time of the current traffic patterns versus those used during training of the GAN. This fact is detected when the discriminator D starts to classify a significant number of pieces of input data as "non-valid". The advantage of this proposal is that the proposed method allows to be applied for detecting when to perform a process for retraining the discriminator neural network due to fact that the statistical current traffic pattern has change substantially versus that use during the phase of training the GAN.

The proposed invention can be implemented in hardware, software, firmware or any combination thereof. If it is implemented in software, the functions can be stored in or coded as one or more instructions or code in a computer-readable medium.

The scope of the present invention is defined in the attached claims.

The invention claimed is:

1. A computer-implemented method for accelerating convergence in the training of generative adversarial networks (GAN) to generate synthetic network traffic, wherein the method comprises:

receiving, in a generator of a GAN, identifiers of at least one class of network traffic;

generating, by the generator, using a random vector, synthetic network traffic elements of the at least one class of network traffic associated with each of the identifiers received and generating a dataset of synthetic network traffic;

training a discriminator of the GAN based on a dataset of real network traffic, the dataset of synthetic network traffic, and a first ratio of elements of dataset of real network traffic to elements of the dataset of synthetic network traffic, wherein the first ratio is such that the elements of the dataset of synthetic network traffic represent a smaller percentage of a total number of elements than that of the elements of the dataset of real network traffic, wherein each element of the dataset of real network traffic is associated by a class of traffic to which a respective element belongs and each element of the dataset of synthetic network traffic is provided to the discriminator identified as synthetic traffic, and wherein the training process for the discriminator comprises adjusting internal parameters of the discriminator;

training the generator by generating new synthetic network traffic based on the dataset of real network traffic, the dataset of synthetic network traffic, and a second ratio of the elements of the dataset of real network traffic to the elements of the dataset of synthetic network traffic, the second ratio being different than the first ratio, wherein, during the training of the generator, each element of the dataset of synthetic network traffic is provided to the discriminator, wherein a total set of elements provided to the discriminator when the generator is training is greater, by a predetermined ratio, than the total set of elements provided to the discriminator when the discriminator is training, wherein during the training process for the generator, the discriminator does not modify the internal parameters of the discriminator, and wherein the training process for the generator comprises adjusting internal parameters of the generator, the adjusting being performed based on a probability of the discriminator classifying an element of the dataset of synthetic network traffic as real traffic; and comparing statistical distributions of the dataset of real network traffic and of the dataset of synthetic network traffic, wherein the comparing comprises:

generating statistical data of the dataset of real network traffic for each set of elements of the same class of traffic;

repeating the generating of the dataset of synthetic network traffic having a first size using the internal parameters of the generator, wherein a difference between the first size and a size of the dataset of real network traffic is within a threshold;

generating statistical data of the dataset of synthetic network traffic for each set of elements of a same class of traffic;

comparing the statistical data of the dataset of real network traffic with the statistical data of the dataset of synthetic network traffic for each class of network traffic;

based on the difference of the statistical data of the dataset of real network traffic with the statistical data of the dataset of synthetic network traffic being less than a predetermined threshold for each class of traffic, concluding GAN training; and based on the difference of the statistical data of the dataset of real network traffic with the statistical data of the dataset of synthetic network traffic not being less than the threshold for each class of traffic, continuing GAN training.

2. The method according to claim 1, wherein the predetermined threshold is specific for each class of traffic.

3. The method according to claim 1, wherein the predetermined threshold is the same for all classes of traffic.

4. The method according to claim 1, which further comprises performing a detection of a divergence of the GAN based on a first difference between the statistical data of the dataset of real network traffic and the statistical data of the dataset of synthetic network traffic being greater than a previous difference for at least one class of traffic, wherein when the first difference is greater than the previous difference, restarting the training of the GAN based on revised internal parameters of the generator and revised internal parameters of the discriminator.

5. The method according to claim 4, wherein a percentage of elements of the dataset of synthetic network traffic out of the total number of elements is different than a previous percentage prior to restarting, and wherein a third ratio of the total number of elements provided to the discriminator during the training of the generator and the total number of elements provided to the discriminator during the training of the discriminator has a different value after the restarting than prior to the restarting.

6. The method according to claim 1, wherein statistical data comprises the mean or standard deviation of at least one characteristic parameter of network traffic elements.

7. The method according to claim 1, wherein a percentage of elements of the dataset of synthetic network traffic out of the total number of elements is between 1% and 20%.

8. The method according to claim 1, wherein the predetermined ratio is in the range of 10-100.

9. The method according to claim 1, wherein the random vector has a uniform distribution with a support of $[-1, 1]^d$.

10. The method according to claim 1, wherein the random vector has a multivariate normal distribution.

11. The method according to claim 1, wherein network traffic comprises network traffic of at least one of the following types: web, video, and traffic coming from a cloud storage service.

12. A non-transitory computer readable medium storing instructions, that when executed, cause at least one processor to:

receive, in a generator of a GAN, identifiers of at least one class of network traffic;

generate, by the generator, using a random vector, synthetic network traffic elements of the at least one class of network traffic associated with each of the identifiers received and generating a dataset of synthetic network traffic;

train a discriminator of the GAN based on a dataset of real network traffic, the dataset of synthetic network traffic, and a first ratio of elements of dataset of real network traffic to elements of the dataset of synthetic network traffic, wherein the first ratio is such that the elements of the dataset of synthetic network traffic represent a smaller percentage of a total number of elements than that of the elements of the dataset of real network traffic, wherein each element of the dataset of real network traffic is associated by a class of traffic to which a respective element belongs and each element of the dataset of synthetic network traffic is provided to the discriminator identified as synthetic traffic, and wherein the training process for the discriminator comprises adjusting internal parameters of the discriminator;

train the generator by generating new synthetic network traffic based on the dataset of real network traffic, the dataset of synthetic network traffic, and a second ratio of the elements of the dataset of real network traffic to the elements of the dataset of synthetic network traffic, the second ratio being different than the first ratio, wherein, during the training of the generator, each element of the dataset of synthetic network traffic is provided to the discriminator, wherein a total set of elements provided to the discriminator when the generator is training is greater, by a predetermined ratio, than the total set of elements provided to the discriminator when the discriminator is training, wherein during the training process for the generator, the discriminator does not modify the internal parameters of the discriminator, and wherein the training process for the generator comprises adjusting internal parameters of the generator, the adjusting being performed based on a probability of the discriminator classifying an element of the dataset of synthetic network traffic as real traffic; and compare statistical distributions of the dataset of real network traffic and of the dataset of synthetic network traffic, wherein the comparing comprises:

generate statistical data of the dataset of real network traffic for each set of elements of the same class of traffic;

repeat the generating of the dataset of synthetic network traffic having a first size using the internal parameters of the generator, wherein a difference between the first size and a size of the dataset of real network traffic is within a threshold;

generate statistical data of the dataset of synthetic network traffic for each set of elements of a same class of traffic;

compare the statistical data of the dataset of real network traffic with the statistical data of the dataset of synthetic network traffic for each class of network traffic;

based on the difference of the statistical data of the dataset of real network traffic with the statistical data of the dataset of synthetic network traffic being less than a predetermined threshold for each class of traffic, conclude GAN training; and based on the difference of the statistical data of the dataset of real network traffic with the statistical data of the dataset of synthetic network traffic not being less than the threshold for each class of traffic, continue GAN training.

* * * * *